United States Patent
Messer et al.

(10) Patent No.: US 9,356,949 B2
(45) Date of Patent: May 31, 2016

(54) NETWORK SERVICE INTERFACE ANALYSIS

(75) Inventors: Zeev Messer, Rishon LeTsiyon (IL);
Kirill Mendelev, Atlanta, GA (US);
Ofer Shezaf, Kibbutz Yiftah (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 50 days.

(21) Appl. No.: 14/381,410

(22) PCT Filed: Feb. 29, 2012

(86) PCT No.: PCT/US2012/027111
§ 371 (c)(1),
(2), (4) Date: Aug. 27, 2014

(87) PCT Pub. No.: WO2013/130066
PCT Pub. Date: Jun. 9, 2013

(65) Prior Publication Data
US 2015/0128280 A1    May 7, 2015

(51) Int. Cl.
*H04L 29/06* (2006.01)
*G06F 21/12* (2013.01)
*G06F 11/36* (2006.01)
*G06F 21/57* (2013.01)

(52) U.S. Cl.
CPC .......... *H04L 63/1433* (2013.01); *G06F 21/128* (2013.01); *G06F 11/3664* (2013.01); *G06F 21/577* (2013.01); *H04L 63/168* (2013.01)

(58) Field of Classification Search
USPC .......................................... 726/25
See application file for complete search history.

(56) References Cited

U.S. PATENT DOCUMENTS

| | | | |
|---|---|---|---|
| 8,707,442 B1 * | 4/2014 | Lax | G06F 17/30887 726/26 |
| 2002/0032694 A1 | 3/2002 | Zawadzki et al. | |
| 2004/0259640 A1 * | 12/2004 | Gentles | G06F 21/128 463/42 |
| 2004/0268303 A1 | 12/2004 | Abe et al. | |
| 2007/0136312 A1 | 6/2007 | Shulman et al. | |
| 2008/0281821 A1 | 11/2008 | Chen et al. | |
| 2009/0193393 A1 | 7/2009 | Baldwin et al. | |
| 2009/0328205 A1 | 12/2009 | Ims et al. | |
| 2010/0235442 A1 | 9/2010 | Zhang et al. | |
| 2011/0264711 A1 | 10/2011 | Thang | |
| 2012/0030516 A1 | 2/2012 | De Keukelaere et al. | |
| 2012/0185567 A1 * | 7/2012 | Ma | G06Q 50/10 709/217 |

FOREIGN PATENT DOCUMENTS

WO    WO-2006081459 A2    8/2006

OTHER PUBLICATIONS

International Searching Authority, Appl No. PCT/US2012/027111, Filed Feb 29, 2012, Search Report and Written Opinion, 9pp, dated Oct. 30, 2012.

(Continued)

*Primary Examiner* — Jason Lee
(74) *Attorney, Agent, or Firm* — Hewlett Packard Enterprise Patent Department

(57) ABSTRACT

In one implementation, a service interface analysis system defines a plurality of service templates based on a plurality of Uniform Resource Identifiers associated with a network service, and generates at least one utility measure of each service template from the plurality of service templates.

15 Claims, 5 Drawing Sheets

(56) References Cited

OTHER PUBLICATIONS

Khorasgani, R.R. et al., Web Service Matching for Restful Web Services, (Research Paper), 13th IEEE International Symposium on Web Systems Evolution (WSE), Sep. 30, 2011, pp. 115-124, Williamsburg, VI.

Lee, Y.J. et al., Building Semantic Ontologies for Restful Web Services, (Research Paper), International Conference on Computer Information Systems and Industrial Management Applications (CISIM), Oct. 8-10, 2010, pp. 383-386, Krackow.

Mario Kozina et al, "A method for identifying Web applications", International Journal of Information Security, Springer, Berlin, DE, vol. 8, No. 6, Aug. 29, 2009.

OWASP Testing Guide 2008 V3.0, Jan. 1, 2008, retrieved on Aug. 5, 2014, p. 57, Section 4.10, p. 292.

Supplementary European Search Report, Oct. 14, 2015, European Patent Application No. 12869680.4, 11 pages.

* cited by examiner

NETWORK SERVICE INTERFACE ANALYSIS

BACKGROUND

Security testing is used to assess a network service such as a web application for vulnerabilities or attack vectors. In one approach to security testing, a security testing application (or scanner) identifies the service interface of the network service (e.g., Uniform Resource Identifiers (URIs) such as Uniform Resource Locators (URLs) at which the application accepts input). The service interface of the network service is sometimes referred to as the attack surface of the network service.

The scanner identifies the service interface of the network service by analyzing web pages related to the network service to identify URIs referencing the network service, such as URIs that include a host identifier of the network service. In some implementations the scanner also provides Hypertext Transfer Protocol (HTTP) requests to and evaluates HTTP responses from the network service to determine whether the network service responds to requests at these URIs and characteristics of data returned in response to such requests.

The scanner then executes attacks based on the service interface such as HTTP requests directed to URIs at which the network service accepts input. These requests are particularly crafted to (e.g., have parameters or data payloads to) test for attack vectors such as memory buffer overflows, Structured Query Language (SQL) injection, privilege elevation, and arbitrary code execution, for example. Additionally, the scanner can diagnose the presence or absence of vulnerabilities by evaluating HTTP responses from the network service.

DETAILED DESCRIPTION

Figure 1:
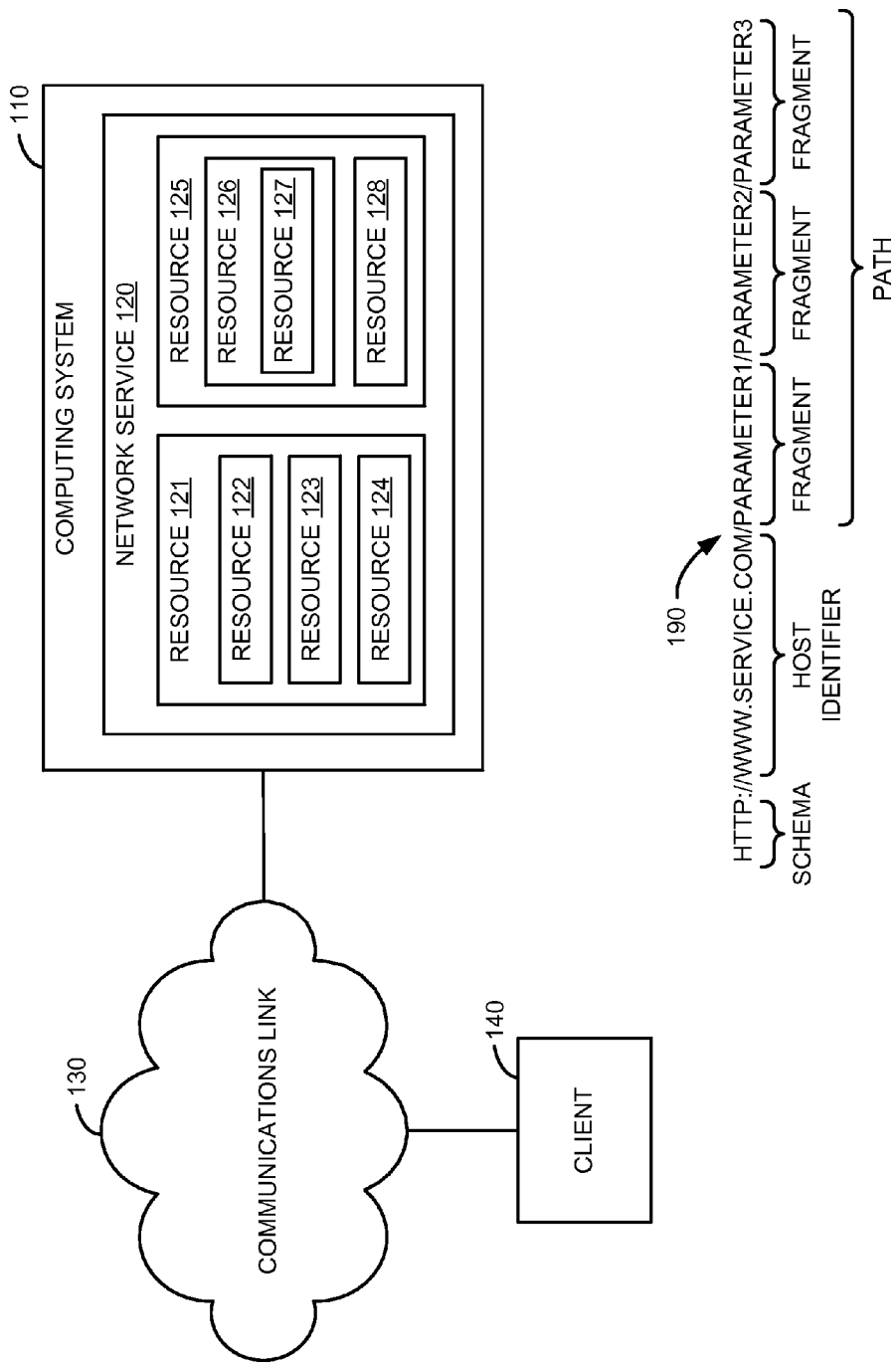
FIG. 1 is an illustration of an environment including a network service, according to an implementation.

Some scanners perform security testing of a network service by first interpreting identified URIs of the service interface of the network service and altering parameters of those URIs to include attack data sets (e.g., data sets intended to test for attack vectors at a network service). Requests (also referred to as service requests or resource requests) such as HTTP requests with the altered URIs are then provided to the network service to perform security testing of the network service.

The service interfaces of some network services lend themselves to such security testing. For example, a service interface can be based on URIs of the form: http://www.service.com/directory/file?parameter1=value1¶meter2=value2. This URI includes a host identifier "www.service.com", a path to a file "/directory/file", and a query string "parameter1=value1¶meter2=value2". Typically, the query string is forwarded to and processed by the file identified by the path. Thus, the query string defines the inputs to the network service, or the service interface. Here, the network service accepts "value1" as an input parameter named "name1" and "value2" as an input parameter named "name2".

A scanner can identify such service interfaces with relative ease because the URIs defining such service interfaces conform to a pattern. More specifically, a resource (here, a file) is identified by a path from the host identifier of the network service, the query string is identified by a question mark character ("?"), each parameter name/value pair is separated from other parameter name/value pairs by an ampersand character ("&"), and the parameter name and value of any parameter name/value pair are separated by an equal sign character ("="). By interpreting URLs according to this pattern, a scanner can identify the values that can be altered to perform security testing of a network service.

The service interfaces of other network services, however, do not lend themselves to such security testing. For example, some network services expose or define a Representational State Transfer (REST) service interface. Service interfaces that conform to principles of REST (or network services that expose such service interfaces) are often referred to as "RESTful". REST is not a protocol, but rather an architectural or interface style. One common trait of many RESTful service interfaces is that URIs for such service interface include parameters (or values of input parameters) as elements of a path of the URI, rather than, for example, as a query string within the URI.

For example, in contrast to the URI example from above (http://www.service.com/directory/file?name1=value1&name2=value2), a RESTful service interface can be based on URIs of any of the following forms: http://www.service.com/directory/file/value1/value2, http://www.service.com/value1/directory/file/value2, http://www.service.com/value2/directory/file/value1, or http://www.service.com/value1/value2/file.html.

Such interfaces are difficult for scanners to recognize because such URIs have a form similar to static URIs. That is, without a separate description of the service interface, the URI http://www.service.com/value1/value2/file.html can be interpreted to refer to a static web page titled "file.html" in a directory with the path "/value1/value2/" at a host identified by "www.service.com", rather than as a URI including two parameters (i.e., "value1" and "value2").

Moreover, such URIs do not conform to a clear pattern from which a scanner can identify parameters (or input parameter values) that can be altered to perform security testing of the network service. As a result, scanners are often unable to effectively perform security testing of network services with such service interfaces without assistance from test engineers with an understanding of the service interface of a network service on which the security testing will be performed.

Implementations discussed herein identify parameters within URIs that can be altered to perform security testing of a network service independent of a description of the service interface of the network service. For example, implementations discussed herein identify such parameters within URIs based on a group of URIs for the service interface of the network service. As a more specific example, a service interface analysis system can define a group of service templates (e.g., URIs or portions thereof in which elements of the URIs that include or may include parameters are identified) based on URIs identified by crawling a group of web pages. Additionally, the service interface analysis system can generate one or more utility measures for each service temple based on properties of that service template. The service interface analysis system can then apply heuristics (e.g., rules to characterize or classify) to the service templates based on the one or more utility measures for each service template to identify service templates that should be discarded as not likely to correctly identify elements of URIs that include parameters. The remaining service templates (i.e., those that are not discarded) can be used to perform security testing of the network service.

FIG. 1 is an illustration of an environment including a network service, according to an implementation. The environment shown in FIG. 1 is illustrated logically rather than physically. For example, components of the environment illustrated in FIG. 1 can include multiple physical components or a single physical component. As a specific example, computing system 110 can be a single computer server, an enclosure or rack of computer servers, a group of virtual machines hosted at a computer server or group of computer servers, or load balancer and a cluster of computer servers.

Client 140 is an application such as a web or Internet browser or other application hosted at a computing system such as a desktop computer, notebook or laptop computer, tablet device, or smartphone. Client 140 accesses resources at network service 120 by requesting those resources using URIs.

Communications link 130 includes devices, services, or combinations thereof that define communications paths between computing system 110, client 140, and/or other devices or services. For example, communications link 130 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Communications link 130 can include communications networks such as an intranet, the Internet, other telecommunications networks, or a combination thereof. Additionally, communications link 130 can include proxies, routers, switches, gateways, bridges, load balancers, and similar communications devices. Furthermore, the connections and communications paths (e.g., between communications link 130 and client 140 and computing system 110) illustrated in FIG. 1 are logical and do not necessarily reflect physical connections.

Computing system 100 hosts network service 120. Network service 120 is an application such as web application via which resources can be accessed. Resources 121-128 are data or collections of data. For example, resource 121 can be a table within a relational database, and resources 121, 123, and 124 can be records within that relational database. Resource 125 can be, for example, container (or collection) of images, resource 126 can be a container within resource 125, resource 127 can be an image within resource 126, and resource 128 can be an image within that resource 125.

Network service 120 defines a service interface via which resources 121-128 can be accessed, for example, by client 140. Said differently, network service 120 defines a structure of URIs that identify resources 121-128. A URI is a group of symbols that identify a resource. Thus, the service interface defines how a URI is interpreted at network service 120 to identify a resource.

URI 190 is an example of a URI. URI 190 includes various fragments (or portions or elements). In the example illustrated in FIG. 1, the fragments of URI 190 are delimited or separated by a slash character ("/"). More specifically, URI 190 includes five fragments: the schema "HTTP" which describes how data is to be communicated; the host identifier which identifies network service 120; and three fragments that are part of the body or path of the URI. In an example in which network service 120 defines a RESTful service interface, for example, the three fragments that are part of the path of the URI can each include a parameter that is used by network service 120 to identify resources. That is, network service 120 interprets the content of these fragments as parameters or input parameter values.

Parameters are data such as symbols, characters, or numbers that are provided within a URI (or request such as an HTTP request including a URI) as input to a network service. A parameter or a group of parameters can identify a resource, identify operations to be performed relative to a resource, represent data for operations to be performed relative to a resource (e.g., data used to update a resource), represent metadata related to a resource, or represent other data related to a resource.

As a specific example, network service 120 can provide information related to books. In this example, resource 121 can be a table within a relation database that includes information about books such as a unique book identifier (e.g., a International Standard Book Number (ISBN)), title, author, date of publication, number of pages, and other information. That is, each of resources 122, 123, 124, and other resources within resource 121 are a collection of information related to a particular book. Additionally, in this example, resource 125 can include images of book covers. More specifically for this example, resource 126 can be a collection of images of different book covers for a particular book (resource 127 can be one of those images), and resource 128 is an image of a book cover. The fragment including PARAMETER1 can be used by network service 120 to determine whether information about a book or a book cover is requested. If PARAMETER1 has the value "data", information about a book is requested and the fragment including PARAMETER2 can be used by network service 120 to identify a unique book identifier of a desired book, and the fragment including PARAMETER3 can be used by network service 120 to identify a particular type or field of information in the resource for that desired book. If PARAMETER1 has the value "cover", a book cover is requested and the fragment including PARAMETER2 can be used by network service 120 to identify the book for which a book cover image is requested using a unique book identifier of the desired book, and the fragment including PARAMETER3 can be used by network service 120 to identify a format of the image requested (e.g., a bitmap image, a JPEG image, a PNG image, a GIF image, or some other image format).

Thus, if client 140 requests a resource at network service 120 by providing the URI http://www.service.com/data/29132464/title to network service 120, network service 120 will provide a response to client 140 with the title of the book uniquely identified by 29132464. Similarly, if client 140 requests a resource at network service 120 by providing the URI http://www.service.com/data/36007380/title to network service 120, network service 120 will provide a response to client 140 with the title of the book uniquely identified by 36007380. However, if client 140 requests a resource at network service 120 by providing the URI http://www.service.com/cover/29132464/JPEG to network service 120, network service 120 will provide a response to client 140 with an image of the book cover for the book uniquely identified by 29132464 in the JPEG format. Moreover, if client 140 requests a resource at network service 120 by providing the URI http://www.service.com/cover/36007380/PNG to network service 120, network service 120 will provide a response to client 140 with an image of the book cover for the book uniquely identified by 36007380 in the PNG format.

A scanner can access a large group of URIs including the host identifier of network service 120 (in this example, www.service.com) by, for example, crawling web pages that link to network service 120 (or resources 121-128 accessible via network service 120) and/or monitoring communications (e.g., network traffic) to computing system 110. These URIs will have the form http://www.service.com/coved<unique book identifier>/<image format> or the form http://www.service.com/data/<unique book identifier>/<information field>. Implementations discussed herein analyze these URIs to generate service templates that describe which fragments of these URIs include parameters that can be altered to perform security testing of network service 120.

Figure 2:
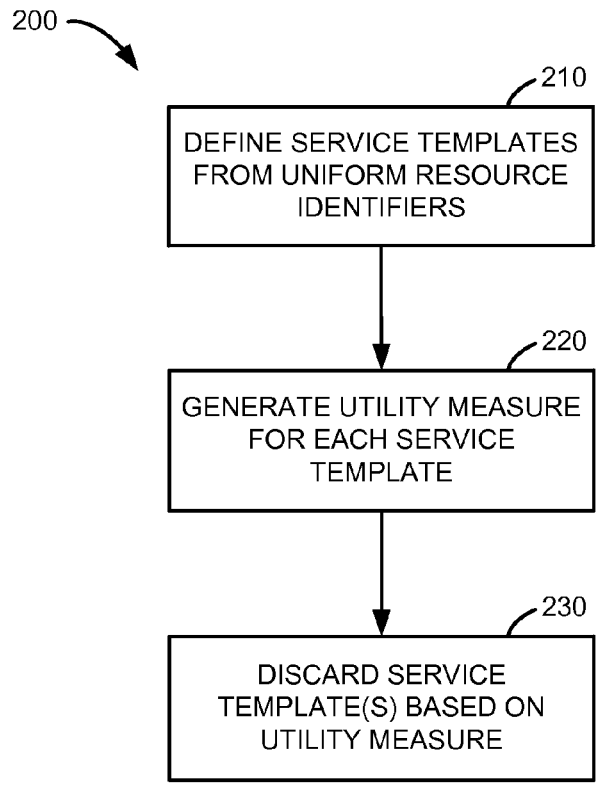
FIG. 2 is a flowchart of a service interface analysis process, according to an implementation.

As an example, FIG. 2 is a flowchart of a service interface analysis process, according to an implementation. Process 200 can be implemented at a service interface analysis system such as a service interface analysis system hosted at a computing system. A group of service templates are defined at block 210 based on a group of URIs. A service template describes a structure for URIs for a service interface of a network service. As an example, a service template can be a URI (or portion thereof) that includes one or more placeholder identifiers at portions (or fragments) of the service template that correspond to fragments of other URIs that include parameters. In other words, the placeholder identifiers in a service template are substitutes for parameters in URIs. The service templates, therefore, describe the service interface (or a portion thereof) by describing the URIs via which the network service accepts input and which fragments of those URIs may include parameters. In other implementations, service templates can be described in formats other than a URI or character string such as using a markup language such as the Extensible Markup Language (XML).

As a specific example, referring to the example discussed above in relation to FIG. 1, a network service can expose a service interface based on URIs of the form: http://www.service.com/cover/<unique book identifier>/<image format> or the form http://www.service.com/data/<unique book identifier>/<information field>. This service interface can be described by, for example, two service templates: http://www.service.com/cover/*/* or the form http://www.service.com/data/*/*, where the asterisk character ("*") is a placeholder identifier. In other words, the service template http://www.service.com/cover/*/* describes a structure for URIs via which the network service accepts input. By replacing the placeholder identifiers (here, asterisk characters) with various values (e.g., alphanumeric character or other symbol strings), data such as an attack data set can be provided as input to the network service.

In this example, a URI can be generated from or based on the service template http://www.service.com/cover/*/* as follows. The first asterisk character can be replaced with the value "SQL ATTACK" to be input to the network service as a unique book identifier, and the second asterisk character can be replaced with the value "SHELL CODE" to be input to the network service as an image format. More specifically, the generated URI in this example would be http://www.service.com/cover/SQL ATTACK/SHELL CODE.

As another example, a service template can be described by XML elements within an XML document. For example, the service template http://www.service.com/cover/*/* can be expressed as:

```
<service template>
    <schema>HTTP</schema>
    <host_identifier>www.service.com</title>
    <fragment>cover</fragment>
    <fragment>*</fragment>
    <fragment>*</fragment>
</service template>,
``` or as:

```
<service template>
    <schema>HTTP</schema>
    <host_identifier>www.service.com</title>
    <fragment>cover</fragment>
    <placeholder>*</placeholder>
    <placeholder>*</placeholder>
</service template>.
```

A placeholder identifier is a symbol or groups of symbols that identify a fragment of a URI that at which other values or symbols can be substituted. In other implementations, placeholder identifiers other than a single symbol can be used. For example, the asterisk character can be replaced with a string. As a specific example, the asterisk character can be replaced with a string of the form "{param_<n>}", where <n> is replaced with an integer for each placeholder identifier. Referring to the example, above, the service template http://www.service.com/cover/*/* can be expressed as http://www.service.com/cover/{param_1}/{param_2}. Moreover, placeholder identifiers can take various other forms in other implementations.

In some implementations, a placeholder identifier can indicate a property or a group of properties of values or symbols that should replace the placeholder identifier to generate a URI to provide input to a network service. For example, a placeholder identifier can be a regular expression that describes whether alphabetic characters, numeric characters, or a combination thereof should replace the placeholder identifier.

In some implementations, a service template does not include a host identifier of a URI. Thus, referring again to the example discussed above, a service template can have the form/cover/*/*, and the host identifier for the service template can be associated with the service template using metadata, a namespace, XML elements, or other methodologies.

Service templates can be defined using a group of URIs identified by crawling a web page or group of web pages or by intercepting communications with a network service using a variety of methodologies. In some implementations, the group of URIs from which the service templates are derived share various properties or characteristics. For example, the group of URIs can have a common number of parameters, host identifier, and/or be associated with one or more HTTP request methods. In other words, URIs identified by crawling a web page or group of web pages or by intercepting communications with a network service can be separated into one or more groups based on various characteristics of the URIs, and service templates can be defined for each group of URIs. As a specific example, service templates can be defined based on (or derived from) URIs and HTTP request methods associated with those URIs.

Additionally, in some implementations, the network service can be accessed using each URI from the group of URIs to determine, for example, whether that URI is currently valid for the network service. If the network service provides a response indicating that the network service was successfully accessed using a URI, that URI can be included in the group. If the network service provides a response indicating that the network service unsuccessfully accessed (e.g., a requested resource is not available or a request was invalid) using a URI, that URI can be discarded from the group.

As an example, a group of service templates can be defined for each URI from the group of URIs. In some implementations, for example, service templates can be defined for a URI by defining service templates for various combinations of values within fragments of that URI and placeholder identifiers. As a specific example, service templates can be defined for a URI by defining a service template each possible combination of values within fragments of that URI and placeholder identifiers. Thus, in this example, $2^n$ service templates are generated for each URI, where n is the number of fragments in a URI (other than the host identifier).

Using the URIs http://www.service.com/cover/36007380/PNG and http://www.service.com/data/36007380/title and the asterisk character as a placeholder identifier to illustrate such an example, the following service templates can be generated for http://www.service.com/cover/36007380/PNG:
http://www.service.com/cover/36007380/PNG,
http://www.service.com/*/36007380/PNG,
http://www.service.com/*/36007380/*,
http://www.service.com/*/*/PNG,
http://www.service.com/*/*/*,
http://www.service.com/cover/*/PNG,
http://www.service.com/cover/*/*,
http://www.service.com/cover/36007380/*.
Similarly, the following service templates can be generated for
http://www.service.com/data/36007380/title:
http://www.service.com/data/36007380/title,
http://www.service.com/*/36007380/title,
http://www.service.com/*/36007380/*
http://www.service.com/*/*/title,
http://www.service.com/*/*/*,
http://www.service.com/data/*/title,
http://www.service.com/data/*/*, and
http://www.service.com/data/36007380/*.
The service templates http://www.service.com/*/*/* and http://www.service.com/*/36007380/* are generated for each URI. Accordingly, 14 unique service templates were generated from these URIs.

In other implementations, service templates can be defined according to other methodologies. As an example, fragments with particular values do not include placeholder values. As a specific example, in some implementations, fragments that include file identifiers (e.g., values of the form <file name>.<file extension>) are not replaced with placeholder identifiers.

As another example, a service interface analysis system implementing process 200 can define service templates based on statistical analysis of a group of URIs. As a specific example, fragments of URIs that have different values in various URIs can be replaced with placeholder identifiers to define the service templates. Using again URIs http://www.service.com/cover/36007380/PNG and http://www.service.com/data/36007380/title and the asterisk character as a placeholder identifier for illustration, the following service templates can be defined:
http://www.service.com/*/36007380/*,
http://www.service.com/*/36007380/PNG, and
http://www.service.com/cover/36007380/*,
http://www.service.com/data/36007380/*,
http://www.service.com/*/36007380/PNG,
http://www.service.com/*/36007380/title.

That is, because the URIs have different values in the first fragment after the host identifier (i.e., cover and data), service templates with a placeholder value in that fragment are defined. Similarly, because the URIs have different values in the third fragment after the host identifier (i.e., PNG and title), service templates with a placeholder value in that fragment are defined. However, because both URIs have the same value in the second fragment after the host identifier (i.e., 36007380), service templates with a placeholder value in that fragment are not defined.

In other implementations, the statistical analysis used to generate service templates can define a variance for each fragment of the URIs in a group of URIs. The service interface analysis system can replace value at those fragments with a variance above a particular threshold value with placeholder identifiers to define the service templates. Thus, fragments with values that are relatively constant (in comparison with the variance threshold) will not be replaced with placeholder values, and fragments with values that are relatively variable (in comparison with the variance threshold) will be replaced with placeholder values. Said differently, a service interface analysis system implementing process 200 assumes that the fragments of URIs with values that vary in different URIs include parameters. That is, the values at those fragments in the URIs are determined to be parameters.

In some implementations, information related to properties of fragments (e.g., the symbols included within those fragments of URIs from which the service templates are derived) that include or are replaced by placeholder identifiers can be described within those placeholder identifiers. This information can be derived from the URIs from which the service templates are derived. That is, a service interface analysis system implementing process 200 can describe the type of symbols (e.g., alphabetic characters, numeric characters, or a combination thereof) or other properties such as a number of symbols observed in the values of fragments within placeholder identifiers that replace (or represent) those values within a service template. Such information can be useful, for example, to describe the type or types of symbols that can be substituted for the placeholder identifiers in a URI generated from a service template. As a specific example, placeholder identifiers can include regular expressions to describe such properties.

At block 220, a utility measure is generated for each service template. In some implementations, a group of utility measures can be generated for each service template or some service templates. A utility measure is a value that represents the utility, applicability, or scope of a service template. Such utility measures can be generated according to a variety of methodologies.

For example a utility measure can be a coverage utility measure that describes the number of URIs covered or matched by a service template. A service template matches or covers a URI is that URI can be generated by replacing placeholder identifiers of that URI with particular values. As a specific example, the service template http://www.service.com/*/36007380/PNG matches http://www.service.com/cover/36007380/PNG and does not match http://www.service.com/data/36007380/title. A coverage utility measure for a service template can be generated, for example, by dividing the number of URIs from a group of URIs matched by that service template by the total number of URIs in that group of URIs.

As another example, a utility measure can be a specificity utility measure that describes how specific a service template is. A service template with few placeholder identifiers can be referred to as specific, for example, because that service template can match fewer URIs that a service template with many placeholder identifiers. Accordingly, a service template with many placeholder identifiers can be referred to as generic. A specificity utility measure for a service template can be generated, for example, by dividing the number of placeholder identifiers in a service template by the total number of fragments in the service template (or URIs satisfied by the service template), and subtracting the quotient from the value 1.

As yet another example, a utility measure can be a rank utility measure that describes the number of placeholder identifies in a service template. Thus, a rank utility measure can be generated by counting the number of placeholder identifiers in the service template. As specific example, a rank utility measure of 1 can be generated for the URI http://www.service.com/*/36007380/PNG, and a rank utility measure of 2 can be generated for the URI http://www.service.com/*/36007380/*.

Although block 220 is illustrated as following block 210, in some implementations, block 220 and block 210 are executed or processed at least in part in parallel. In other words, a utility measure can be generated for a service template at least in part while that service template is defined. For example, in some implementations as discussed above, a group of service templates are defined for each URI in a group of URIs. A count of the number of times each unique service template is defined can be maintained while the service templates are defined. The count for each unique service template is the number of URIs from the group of URIs that are matched by that unique service template.

At block 230, service templates are discarded based on the utility measure (or utility measures) of each service template. For example, a threshold (e.g., a minimal threshold or maximal threshold) or multiple thresholds (e.g., an upper threshold and lower threshold to define a range) can be defined (e.g., predefined by a user) for a utility measure. As specific examples of such thresholds, a threshold for a coverage utility measure can be no less than 0.05 (or 5%), a threshold for a specificity utility measure can be no less than 0.25, and a threshold for a rank utility measure can be no more than 4. If the utility measure of a service template satisfies the threshold (e.g., is above, below, or within a range depending on the threshold), the service template is retained. If the utility measure of a service template does not satisfy the threshold, the service template is discarded at block 230. For example, the service template can be removed from a list within a memory or a file of service templates. In some implementations, a service template can be discarded by ignoring the service template or designating the service template (e.g., in metadata for the service template) as inactive.

The remaining service templates (i.e., those that were not discarded at block 230) can then be used, for example, to perform security testing of the network service. For example, an analysis module can replace the placeholder identifiers of the service templates with attack data sets to define URIs. The network service can then be accessed using these URIs to attempt to identify or exploit security vulnerabilities in the network service. That is, the network service accepts the attack data sets as input because they are located at fragments of URIs the network service expects to include parameters.

Figure 3:
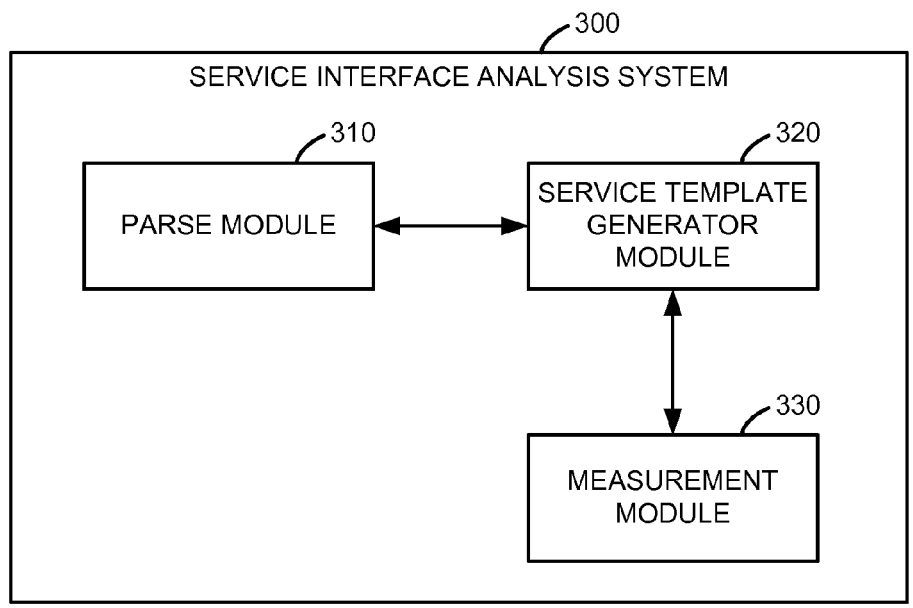
FIG. 3 is schematic block diagram of a service interface analysis system, according to another implementation.

FIG. 3 is schematic block diagram of a service interface analysis system, according to another implementation. Although various modules (i.e., combinations of hardware and software) are illustrated and discussed in relation to FIG. 3 and other example implementations, other combinations or sub-combinations of modules can be included within other implementations. Said differently, although the modules illustrated in FIG. 3 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Parse module 310 is a combination of hardware and software that parses URIs to identify the fragments (or portions) of each URI. For example, parse module 310 can separate URIs based on a delimiter symbol or character such as a slash character ("/") into a schema identifier, a host identifier, and a group of fragments. Additionally, parse module 310 communicates (e.g., exchanges signals representing data or information) with service template generator module 320 to provide the fragments of URIs to service template generator module 320. In some implementations, parse module 310 provides a URI intact (i.e., the full URI) and the parsed fragments of the URI to service template generator module 320.

Service template generator module 320 is a combination of hardware and software that defines service templates based on the URIs parsed at parse module 310. For example, service template generator module 320 can define a group of service templates for each URI parsed at parse module 310. In some implementations, service template generator module 320 performs statistical analysis on the URIs parsed at parse module 310 to define a group of service templates for those URIs.

Additionally, service template generator module 320 communicates with measurement module 330 to provide service templates to measurement module 330. Measurement module 330 is a combination of hardware and software that generates utility measures for the service templates generated at service template generator module 320. In some implementations, service template generator module 320 also provides information such as a number of URIs that are matched by a service template to measurement module 330.

Moreover, in some implementations, measurement module 330 also determines whether service templates should be discarded based on utility measures and/or thresholds. That is, after determining a utility measure of a service template, measurement module 330 can compare that utility measure with a related threshold and discard the service template if that utility measure does not satisfy the related threshold. In other implementations, service interface analysis system 300 can include a separate module or component such as a filter module to determine whether service templates should be discarded. In yet other implementations, service interface analysis system 300 can store service templates at a data store such as a database or a filesystem, or can provide the service templates to another system to use the service templates, for example, to perform security testing of a network service.

Figure 4:
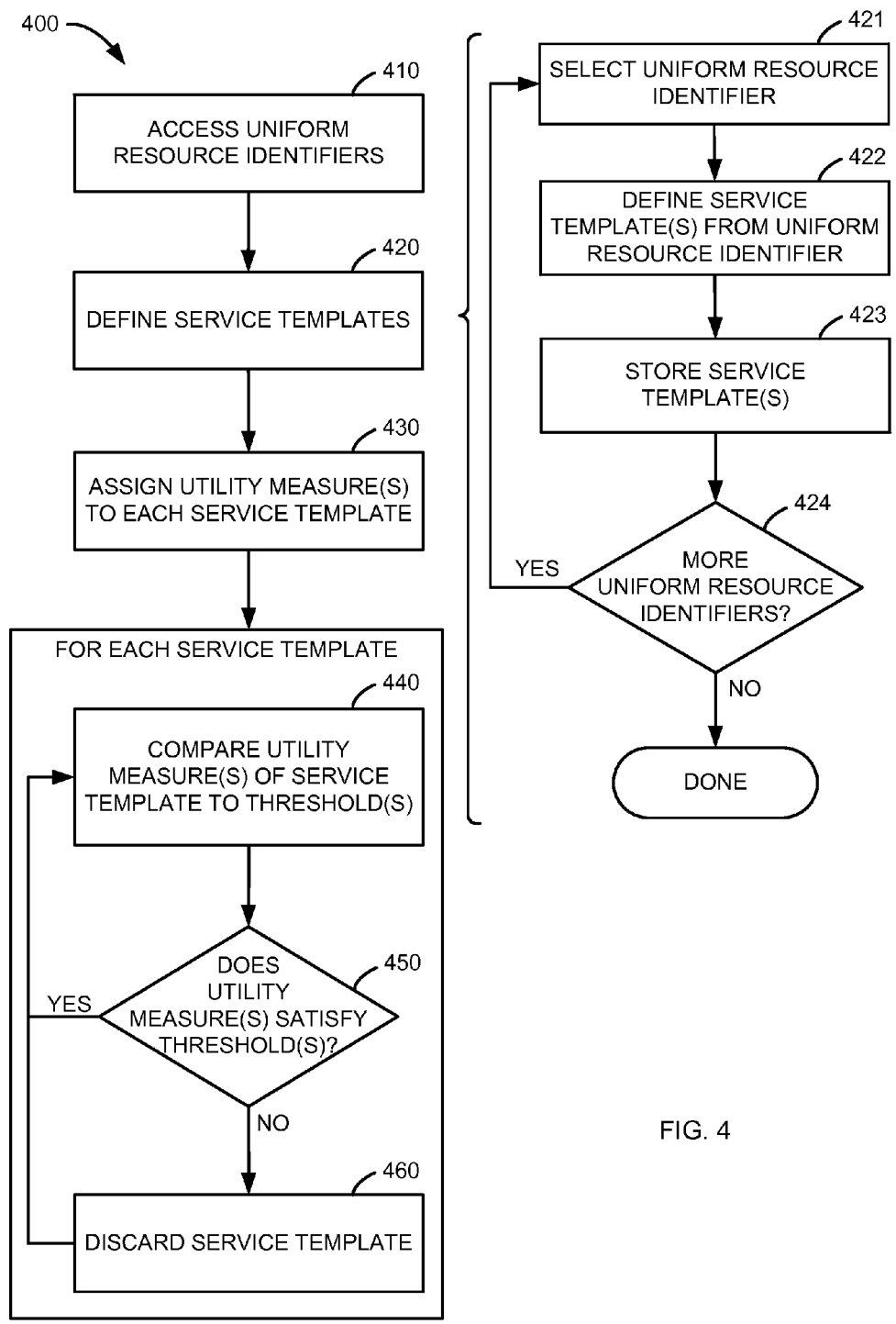
FIG. 4 is a flowchart of a service interface analysis process, according to another implementation.

FIG. 4 is a flowchart of a service interface analysis process, according to another implementation. At block 410, URIs that will be used to define service templates are accessed. URIs can be accessed at a variety of locations and using a variety of methodologies. For example, a scanner can crawl web pages and store URIs identified during the crawling at a database prior to execution or process 400, and the URIs can be accessed at the database at block 410. More specifically, for example, a service interface analysis system can identify URIs at a web page (and other web pages to which the web page includes hyperlinks), provide those URIs or requests based on or including those URIs to a network service, and store at a database those URIs that cause particular responses (e.g., HTTP responses including a resource or information related to a resource) from the network service. In other words, URIs associated with requests in response to which a network service provides responses indicating success can be stored at the database. In other implementations, the crawling can be performed by a service interface analysis system implementing process 400 at block 410. In yet other implementations, URIs can be input by a user of a service interface analysis system implementing process 400. For example, the user can provide or specify within a filesystem a data file that includes a group of URIs.

Service templates can then be defined at block 420. For example, as illustrated in FIG. 4 and discussed above in relation to FIG. 2, service templates can be defined by: selecting at block 421 a URI from the URIs accessed at block 410; defining at block 422 one or more service templates based on the URI selected at block 421 (e.g., defining service templates that are satisfied by the URI selected at block 421); storing at block 423 the service templates defined at block 422 at, for example, a portion of a memory allocated for service templates; returning to block 421 from block 424 if there are additional URIs; and completing block 420 if there are no additional URIs at block 424. Accordingly, the service templates for each URI are aggregated into a group of service templates for the group of URIs. In other implementations, service templates can be defined at block 420 using other methodologies.

One or more utility measures are then generated and assigned to each service template at block 430. As discussed above in relation to block 220 of FIG. 2, in some implementations, utility measures are generated at least partially in parallel with block 420. The utility measures are then used to determine whether a service template should be discarded at blocks 440, 450, and 460.

Blocks 440, 450, and 460 are repeated for each service template defined at block 420. More specifically, for each service template, one or more utility measures assigned to that service template are compared with one or more related thresholds at block 440. If those utility measures satisfy those thresholds at block 450, process 400 returns to block 440 for another service template. In other words, the current service template is not discarded. If those utility measures do not satisfy those thresholds at block 450, process 400 proceeds to block 450 at which the current service template is discarded. Process 400 then returns to block 440 for another service template.

Process 400 illustrated in FIG. 4 is an example implementation, and other implementations can include additional, fewer, different, or rearranged blocks. For example, whether process 400 proceeds to block 440 or to block 460 from block 450 can vary according to different implementations. For example, in some implementations, a service template is discarded if any utility measure assigned to that service template does not satisfy a related threshold at block 450. In other implementations, a service template is discarded if all utility measures assigned to that service template do not satisfy related thresholds at block 450. In yet other implementations, a service template is discarded if a majority or some other predetermined group of utility measures assigned to that service template does not satisfy related thresholds at block 450.

Figure 5:
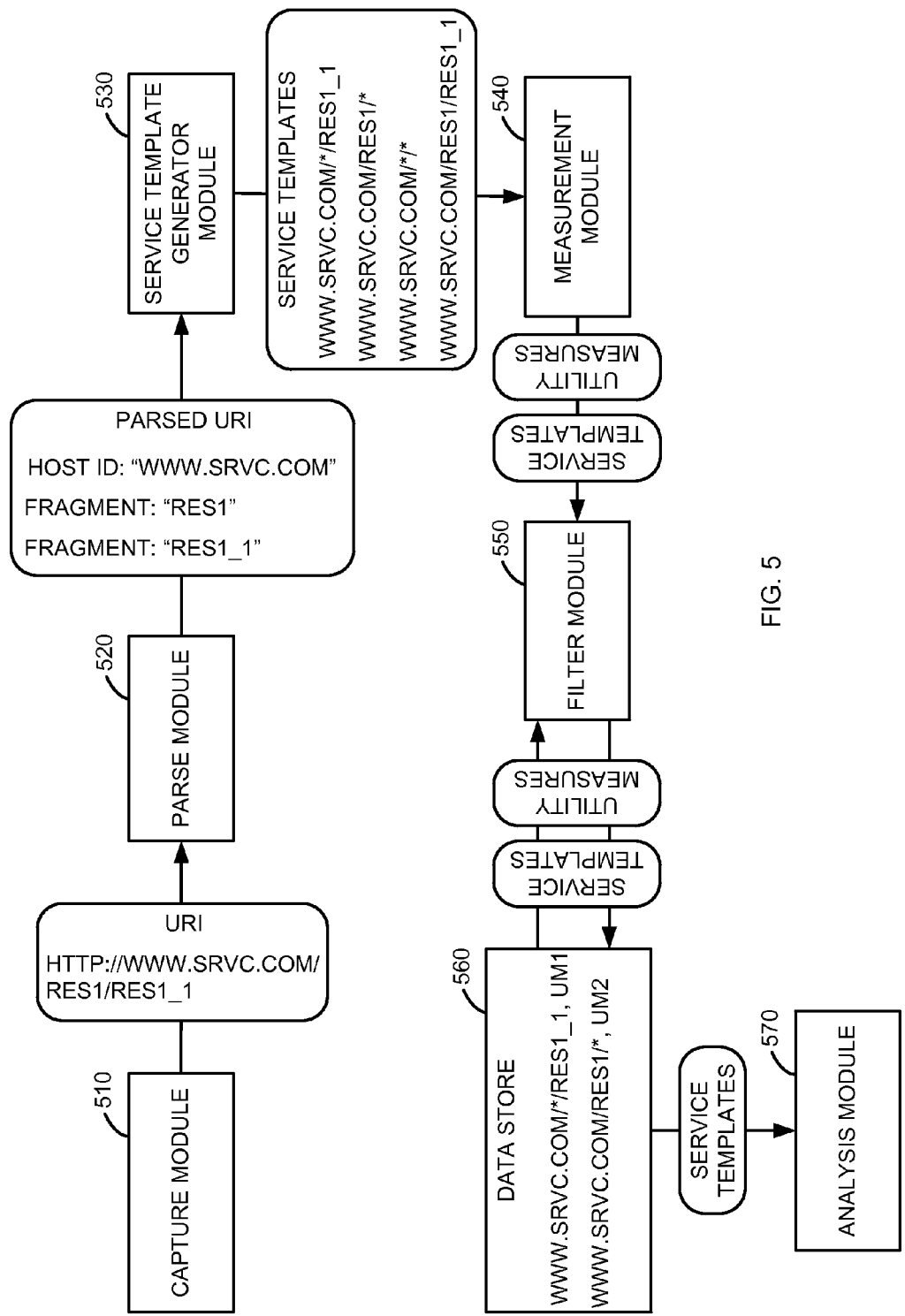
FIG. 5 is a data flow diagram of a service interface analysis system, according to an implementation.

FIG. 5 is a data flow diagram of a service interface analysis system, according to an implementation. That is, FIG. 5 illustrates data or information flow through a service interface analysis system. Capture module 510, parse module 520, service template generator module 530, measurement module 540, filter module 550, data store 560, and analysis module 570 are components of the service interface analysis system. In some implementations, one or more of capture module 510, parse module 520, service template generator module 530, measurement module 540, filter module 550, data store 560, and analysis module 570 can be separate from or external to the service interface analysis system. For example, data store 560 can be separate from, but accessible to, the service interface analysis system.

Capture module 510 crawls web pages and/or intercepts communications with a network service to access URIs for that network service. Capture module 510 then provides these URIs to parse module. In the example illustrated in FIG. 5, one URI provided to parse module 520 is HTTP://WWW.SRVC.COM/RES1/RES1_1.

Parse module 520 parses the URIs to identify fragments of the URIs such as host identifiers and other fragments. Information from the parsed URIs is then provided to service template generator module 530. In this example, the URI HTTP://WWW.SRVC.COM/RES1/RES1_1 is separated into host identifier "WWW.SRVC.COM", fragment "RES1", and fragment "RES1_1". Service template generator module 530 then defines a group of services templates for the URI or group of URIs. In this example, the service templates WWW.SRVC.COM/*/RES1_1, WWW.SRVC.COM/RES1/*, WWW.SRVC.COM/*/*, and WWW.SRVC.COM/RES1/RES1_1 are defined at service template generator module 530.

Service template generator module 530 provides the service templates to measurement module 540 which generates utility measures for the service templates. In this example, measurement module 540 provides the service templates and utility measures to filter module 550. Filter module 550 discards some service templates based on utility measures assigned to those service templates, and stores the remaining service templates and utility measures assigned to those service templates at data store 560. As illustrated in FIG. 5, the service template WWW.SRVC.COM/*/* was discarded as too generic (e.g., because all fragments other than the host identifier include placeholder values), and WWW.SRVC.COM/RES1/RES1_1 was discarded as too specific (e.g., because no fragments include placeholder values).

Moreover, as illustrated in FIG. 5, filter module 550 can also access service templates and utility measures assigned to those service templates at data store 560. For example, filter module 550 can access data store 560 to update utility measures based on newly received service templates and/or utility measures. As a more specific example, filter module 550 can update a utility measure assigned to a service template if another instance of that service template is received from measurement module 540 (e.g., that service template is subsequently defined again at service template generator module 530 based on a URI received from parse module 520). That is, with reference to the example illustrated in FIG. 5, filter module 550 can update utility measures UM1 at data store 560 if another service template of the form WWW.SRVC.COM/*/RES1_1 is received from measurement module 540.

Analysis module 570 accesses service templates at data store 560, and performs security testing of a network service. For example, analysis module 570 can replace the placeholder identifiers (here, asterisk characters) with attack data sets to provide input to the network service that is intended to expose security vulnerabilities of the network service. More specifically, for example, analysis module 570 can generate URIs based on service templates by replacing the placeholder identifiers with attack data sets to expose security vulnerabilities related to memory buffer overflows, Structured Query Language (SQL) injection, privilege elevation, and arbitrary code execution. Analysis module 570 can then provide those URIs or requests including those URIs to a network service to expose security vulnerabilities of the network service.

Figure 6:
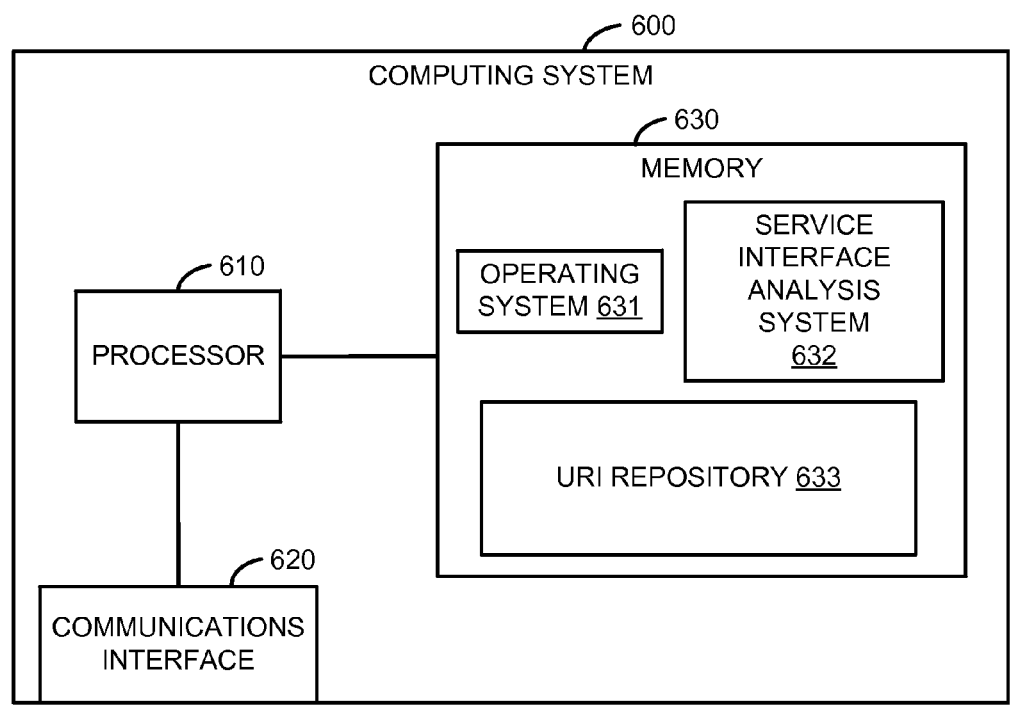
FIG. 6 is a schematic block diagram of a service interface analysis system hosted at a computing system, according to an implementation.

In some implementations, a service interface analysis system such as service interface analysis system 300 illustrated in FIG. 3 or the service interface analysis system illustrated in FIG. 5 is hosted at a computing system. FIG. 6 is a schematic block diagram of a service interface analysis system hosted at a computing system, according to an implementation.

In the example illustrated in FIG. 6, computing system 600 includes processor 610, communications interface 620, and memory 630; and hosts operating system 631 and service interface analysis system 632. Processor 610 is any combination of hardware and software that executes or interprets instructions, codes, or signals. For example, processor 610 can be a microprocessor, an application-specific integrated circuit (ASIC), a distributed processor such as a cluster or network of processors or computing systems, a multi-core or multi-processor processor, or a virtual or logical processor of a virtual machine.

Communications interface 620 is a module via which processor 610 can communicate with other processors or computing systems via a communications link. For example, communications interface 620 can include a network interface card and a communications protocol stack hosted at processor 610 (e.g., instructions or code stored at memory 630 and executed or interpreted at processor 610 to implement a network protocol) to communicate network services. As specific examples, communications interface 620 can be a wired interface, a wireless interface, an Ethernet interface, a Fiber Channel interface, an InfiniBand interface, and IEEE 802.11 interface, or some other communications interface via which processor 610 can exchange signals or symbols representing data to communicate with other processors or computing systems.

Memory 630 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 630 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. Said differently, memory 630 can represented multiple processor-readable media. In some implementations, memory 630 can be integrated with processor 610, separate from processor 610, or external to computing system 600.

Memory 630 includes instructions or codes that when executed at processor 610 implement operating system 631 and service interface analysis system 632. Additionally, memory 630 can store URI repository 633 at which a group of URIs, from which service interface analysis system 632 will define a group of service templates, is stored during run-time (or execution) of service interface analysis system 632.

In some implementations, computing system 600 can be a virtualized computing system. For example, computing system 600 can be hosted as a virtual machine at a computing server. Moreover, in some implementations, computing system 600 can be a virtualized computing appliance, and operating system 631 is a minimal or just-enough operating system to support (e.g., provide services such as a communications protocol stack and access to components of computing system 600 such as communications interface 620) service interface analysis system 632.

Service interface analysis system 632 can be accessed or installed at computing system 600 from a variety of memories or processor-readable media. For example, computing system 600 can access service interface analysis system 632 at a remote processor-readable medium via communications interface 620. As a specific example, computing system 600 can be a thin client that accesses operating system 631 and service interface analysis system 632 during a boot sequence.

As another example, computing system 600 can include (not illustrated in FIG. 6) a processor-readable medium access device (e.g., CD, DVD, SD, MMC, or a CF drive or reader), and can access service interface analysis system 632 at a processor-readable medium via that processor-readable medium access device. As a more specific example, the processor-readable medium access device can be a DVD drive at which a DVD including an installation package for service interface analysis system 632 is accessible. The installation package can be executed or interpreted at processor 610 to install service interface analysis system 632 at computing system 600 (e.g., at memory 630). Computing system 600 can then host or execute service interface analysis system 632.

In some implementations, service interface analysis system 632 can be accessed at or installed from multiple sources, locations, or resources. For example, some component of service interface analysis system 632 can be installed via a communications link, and other components of service interface analysis system 632 can be installed from a DVD.

In other implementations, service interface analysis system 632 can be distributed across multiple computing systems. That is, some components of service interface analysis system 632 can be hosted at one computing system and other components of service interface analysis system 632 can be hosted at another computing system or computing systems. As a specific example, service interface analysis system 632 can be hosted within a cluster of computing systems where each component of service interface analysis system 632 is hosted at multiple computing systems, and no single computing system hosts each component of service interface analysis system 632.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Moreover, the term "provide" as used herein includes push mechanism (e.g., sending data via a communications path or channel), pull mechanisms (e.g., delivering data in response to a request from the scanner), and store mechanisms (e.g., storing data at a data store or service at which the data can be accessed). Furthermore, as used herein, the term "based on" includes based at least in part on. Thus, a feature that is described as based on some cause, stimulus, or data; can be based only on that cause, stimulus, or data; or based on that cause, stimulus, or data and on one or more other causes, stimuli, or data.

What is claimed is:

1. A processor-readable non-transitory medium, comprising code representing instructions that when executed at a hardware processor cause the hardware processor to:
    define a plurality of service templates based, at least in part, on a number of fragments in a Uniform Resource Identifier, wherein the Uniform Resource Identifier is associated with a network service;
    generate at least one utility measure of each service template from the plurality of service templates;
    identify a host identifier of the network service and at least one fragment in the Uniform Resource Identifier;
    generate, for the Uniform Resource Identifier, a group of service templates by replacing the at least one fragment with at least one placeholder identifier;
        wherein the at least one placeholder identifier represents a parameter associated with a particular fragment; and
        wherein the plurality of service templates are further defined for the Uniform Resource Identifier based, at least in part, on how many unique service templates from the group of service templates match the Uniform Resource Identifier; and
    discard a service template from the plurality of service templates based on the at least one utility measure of the service template.

2. The processor-readable non-transitory medium of claim 1, further comprising code representing instructions that when executed at the hardware processor cause the hardware processor to:
    provide a request to the network service; and
    define the Uniform Resource Identifiers based on responses from the network service that indicate that the network service was successfully accessed using the Uniform Resource Identifier.

3. The processor-readable non-transitory medium of claim 1, wherein the at least one utility measure includes at least one of a coverage measure, a specificity measure, a degree measure, or a combination of the above.

4. The processor-readable non-transitory medium of claim 1, further comprising code representing instructions that when executed at the hardware processor cause the hardware processor to determine that the at least one utility measure of the service template does not satisfy a predetermined threshold for the at least one utility measure.

5. A service interface analysis system, comprising:
    a parse module to identify a host identifier of a network service and at least two fragments within each Uniform Resource Identifier from a plurality of Uniform Resource Identifiers;
    a service template generator module to
        generate a group of service templates for each Uniform Resource Identifier by replacing one or more fragments from the at least two fragments with at least one placeholder identifier;
            wherein the at least one placeholder identifier represents a parameter associated with a particular fragment among the at least two fragments; and
            wherein the group of service templates are further defined for each Uniform Resource Identifier based, at least in part, on how many unique service templates from the group of service templates match that Uniform Resource Identifier; and
    a measurement module to assign at least one utility measure to the at least one service template for each Uniform Resource Identifier.

6. The system of claim 5, further comprising:
    a filter module to discard a service template from the group of service templates for a Uniform Resource Identifier based on the at least one utility measure assigned to at least one service template for the Uniform Resource Identifier.

7. The system of claim 5, wherein the at least one utility measure assigned to at least one service template for each Uniform Resource Identifier includes at least one of a coverage measure, a specificity measure, a degree measure, or a combination of the above.

8. The system of claim 5, wherein the at least one utility measure assigned to at least one service template for each Uniform Resource Identifier includes at least two of a coverage measure, a specificity measure, a degree measure, or a combination of the above.

9. The system of claim 5, further comprising:
    a capture module to identify the plurality of Uniform Resource Identifiers based on communications with the network service.

10. The system of claim 5, further comprising:
    an analysis module to provide requests to the network service, the requests based on information contained in at least one service template from the group of service templates associated with each Uniform Resource Identifier, wherein each request includes an attack data set.

11. A service interface analysis method, comprising:
    accessing Uniform Resource Identifiers at a memory, wherein the Uniform Resource Identifiers are associated with a network service;
    for each Uniform Resource Identifier,
        identifying a host identifier of the network service and at least two fragments within each Uniform Resource Identifier, and
        replacing one or more fragments from the at least two fragments within each Uniform Resource Identifier with at least one placeholder identifier to define a group of service templates for each Uniform Resource Identifier;
            wherein the group of service templates are further defined for each Uniform Resource Identifier based, at least in part, on how many unique service templates from the group of service templates match a particular Uniform Resource Identifier; and
            wherein the at least one placeholder identifier represents a parameter associated with a particular fragment among the at least two fragments;
    aggregating the service templates for each Uniform Resource Identifier to further define the group of service templates; and assigning a utility measure to each service template among the group of service templates.

12. The method of claim 11, wherein the utility measure assigned to each service template includes at least one of a coverage measure, a specificity measure, a degree measure, or a combination of the above.

13. The method of claim 11, further comprising:
discarding a service template from the group of service templates based on the utility measure assigned to the service template.

14. The processor-readable non-transitory medium of claim 1, comprising code representing instructions that when executed at a hardware processor cause the hardware processor to define $2^n$ service templates for each Uniform Resource Identifier among the Uniform Resource Identifiers, wherein n is a number of fragments associated with each Uniform Resource Identifier among the Uniform Resource Identifiers excluding a host identifier associated with each Uniform Resource Identifier.

15. The system of claim 5, wherein the at least one utility measure assigned to at least one service template for each Uniform Resource Identifier includes a rank utility measure, wherein the rank utility measure is defined by how many placeholder identifiers are in the at least one service template.

* * * * *